(12) United States Patent
Sakata et al.

(10) Patent No.: US 6,612,544 B2
(45) Date of Patent: Sep. 2, 2003

(54) ELECTROMAGNETIC VALVE

(75) Inventors: Akira Sakata, Tokyo (JP); Hiroaki Matuzawa, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 3 days.

(21) Appl. No.: 10/076,366

(22) Filed: Feb. 19, 2002

(65) Prior Publication Data
US 2003/0047699 A1 Mar. 13, 2003

(30) Foreign Application Priority Data
Sep. 10, 2001 (JP) ........................ 2001-273948

(51) Int. Cl.$^7$ ................................ F16K 31/06
(52) U.S. Cl. ................ 251/129.15; 251/129.2
(58) Field of Search ................ 251/129.15–129.22

(56) References Cited

U.S. PATENT DOCUMENTS

| | | | | |
|---|---|---|---|---|
| 4,250,922 A | * | 2/1981 | Will et al. ............. | 137/625.65 |
| 4,360,163 A | * | 11/1982 | Williams ............... | 137/625.65 |
| 4,953,590 A | * | 9/1990 | Kakinuma et al. ..... | 251/129.15 |
| 5,036,885 A | * | 8/1991 | Miura ................... | 251/129.15 |
| 5,101,856 A | * | 4/1992 | Kakinuma et al. ...... | 201/129.1 |
| 6,109,298 A | * | 8/2000 | Kaneko et al. ........ | 137/625.64 |
| 6,439,184 B1 | * | 8/2002 | Takenaka et al. ....... | 123/90.17 |

FOREIGN PATENT DOCUMENTS

JP 2000-130625 5/2000

* cited by examiner

*Primary Examiner*—Paul J. Hirsch
(74) *Attorney, Agent, or Firm*—Sughrue Mion, PLLC

(57) ABSTRACT

This electromagnetic valve includes a spool 6 slidably accommodated in a valve housing, for opening or closing ports 2, 3, 4, 5a, and 5b, a pair of fixed iron cores 8, 11 arranged on axially provided one end side of the spool 6 and coaxially opposed to each other, and a plunger 15 arranged with the spool 6 between the fixed iron cores 8, 11. A sleeve bearing 20 is coaxially provided with the pair of fixed iron cores 8, 11 between the pair of fixed iron cores 8, 11, and the plunger 15 is slidably contacted with the inside of the sleeve bearing 20.

14 Claims, 6 Drawing Sheets

ELECTROMAGNETIC VALVE

BACKGROUND OF THE INVENTION

1. Field of the Invention

The present invention relates to a plunger-type electromagnetic valve for appropriately controlling hydraulic pressure, for example, in a valve timing varying device for controlling a timing of opening or closing the intake-exhaust valves of an internal combustion engine.

2. Description of the Related Art

FIG. 11 is a cross sectional view showing a conventional electromagnetic valve.

Referring to FIG. 11, a reference numeral 1 denotes a valve housing having a plurality of ports 2, 3, 4 and 5a, 5b for connecting fluid passages. A reference numeral 6 denotes a spool, accommodated in the valve housing 1 slidable in the axial direction, for opening or closing the ports 2, 3, 4, and 5a, 5b. A reference numeral 7 denotes a yoke coupled and fixed to axially provided one end of the valve housing 1. A reference numeral 8 denotes a boss arranged at the axial center on the side coupled to the valve housing 1 of the yoke 7. The boss 8 acts as a fixed iron provided core on the plunger 15 side and is made of a cylindrical magnetic material.

A reference numeral 9 denotes a coil bobbin fitted to the yoke 7. A reference numeral 10 denotes a linear coil wound around the outer periphery of the coil bobbin 9. A reference numeral 11 denotes a core (fixed iron core) fitted to an axially provided end of the yoke 7 and the core 11 is made of a magnetic material with which a cylindrical portion 11a is integrally formed. The cylindrical portion 11a is fitted to the coil bobbin 9 and coaxially opposed to the above boss 8.

A reference numeral 12 denotes a bearing fitted to the boss 8. A reference numeral 13 denotes a bearing fitted to the cylindrical portion 11a of the core 11. A reference numeral 14 denotes a non-magnetic plunger rod whose both ends are slidably supported by the bearings 12, 13 in the axial direction. A reference numeral 15 denotes a plunger having therein a plunger rod 14 passing therethrough and fixed to its axial center. The plunger 15 is made of a magnetic material and capable of moving in the axial direction with the plunger rod 14. A reference numeral 16 denotes a spring for urging the spool 6 in the abutting direction against the plunger rod 14. A reference numeral 17 denotes a terminal electrically coupled to the linear coil 10. A reference numeral 18 denotes a resin for molding the linear coil 10 and the terminal 17.

FIG. 12 is a cross sectional view showing an example of a valve timing adjusting device with the electromagnetic valve shown in FIG. 11.

Referring to FIG. 12, a reference numeral 30 denotes a cam shaft having a cam 31 for opening or closing the intake-exhaust valves of an internal combustion engine. A reference numeral 32 denotes an actuator which is provided on one end of the cam shaft 30 for changing a valve timing. By driving the actuator 32 with the lubricating oil (hydraulic oil) of the internal combustion engine, a displacement angle of the cam shaft 30 is varied to continuously change the timing of opening or closing the intake valve or the exhaust valve of the internal combustion engine.

A reference numeral 33 denotes the housing of the actuator 32 and the housing 33 is rotatably mounted on the cam shaft 30. A reference numeral 34 denotes a timing pulley or a timing sprocket integrally combined with the housing 33. The timing pulley or the timing sprocket 34 serves as an input rotating member for receiving a rotational driving force from the crankshaft of the internal combustion engine via a timing belt or a timing chain.

A reference numeral 35 denotes a case fixed to the housing 33. A reference numeral 36 denotes a vane-type rotor coupled and fixed to the cam shaft 30 and accommodated in the case 35. The rotor 36 is relatively slidable with respect to the case 35 within a predetermined angle range. A reference numeral 37 denotes a cover fixed to the case 35. A reference numeral 38 denotes a plate for closing the opening of the cover 37. A reference numeral 39 denotes a locking holder provided on the rotor 36. A reference numeral 40 denotes a lock pin slidably built in the housing 33. The lock pin 40 is removably engaged with the holder 39 to restrain the rotation of the rotor 36 or release the restraint.

A reference numeral 41 denotes a spring for urging the lock pin 40 in the engaging direction with the holder 39. A reference numeral 42 denotes a lock-releasing oil passage for introducing the hydraulic oil into the holder 39. The lock pin 40 is moved against the spring 41 by the hydraulic oil introduced into the holder 39 from the lock-releasing oil passage 42 and is coned off from the inside of the holder 39 to release the restraint of the rotor 36. Reference numerals 43, 44 and 45 denote an air inlet, a shaft bolt for fixing the rotor 36 to the cam shaft 30, and an air inlet, respectively.

FIG. 13 is a cross sectional view taken along a line A A in FIG. 12.

Referring to FIG. 13, a reference numeral 46 denotes a plurality of vanes protruded on the outer peripheral surface of the rotary body of the rotor 36. A reference numeral 47 denotes a plurality of shoes (the same number as the vanes 46) protruded on the inner peripheral surface of the case 35. A reference numeral 48 denotes tip seals provided on the tips of the respective shoes 47 and each tip seal 48 is slidably pressed to the rotary body of the rotor 36 by the urging force of the back spring 49 shown in FIG. 12. A reference numeral 50 denotes tip seals provided on the tips of the respective vanes 46 and each tip seal 50 is slidably contacted with the inner peripheral surface of the case 35 by a back spring (not shown).

A reference numeral 51 denotes a lag hydraulic chamber for moving the vane 46 in the lagging direction with the hydraulic oil. A reference numeral 52 denotes an advance hydraulic chamber for moving the vane 46 in the advancing direction with the hydraulic oil. Each of the lag hydraulic chambers 51 and the advance hydraulic chambers 52 is made of a fan-shaped space formed between case 35 and the rotor 36, and between the shoe 47 and the vane 46, and is supplied therein with the hydraulic oil.

A reference numeral 53 denotes a communication oil passage formed in one vane 46 to make the lag hydraulic chamber 51 communicate with the advance hydraulic chamber 52 on both sides of the vane 46. A reference number 54 denotes a moving groove formed on the midway of the communication oil passage 53. The lock-releasing oil passage 42 is communicated with the moving groove 54 on the midway thereof. A reference numeral 55 denotes a slide plate moving along the moving groove 54. The slide plate 55 divides the communication oil passage 53 to prevent an oil leakage between the lag hydraulic chamber 51 and the advance hydraulic chamber 52. When the hydraulic pressure in the lag hydraulic chamber 51 is high, the slide plate 55 moves to the advance hydraulic chamber 52, and when the hydraulic pressure in the advance hydraulic chamber 52 is high, the slide plate 55 moves to the lag hydraulic chamber 51. In this manner, the slide plate plays a change valve for switching the oil passages.

In the above, the cam shaft 30 and the rotor 36 are provided with the first oil passage 56 and the second oil passage 57 as shown in FIG. 12. The first oil passage 56 communicates with the lag hydraulic chamber 51 and the second oil passage 57 with the advance hydraulic chamber 52. The rotor 36 is relatively rotated with respect to the housing 33 in proportion to the quantity of hydraulic oil supplied to the lag hydraulic chamber 51 and the advance hydraulic chamber 52 to vary the volume of the lag hydraulic chamber 51 and the advance hydraulic chamber 52.

In FIG. 12, a reference numeral 60 denotes an oil control valve (hereinafter referred to as an OCV) for supplying the hydraulic oil to the actuator 32 and controlling the quantity of the oil therein. The electromagnetic valve of OCV 60 in FIG. 11 is reversely engaged. Reference numerals 61, 62, and 63 denote an oil pan, an oil pump and an oil filter, respectively. A reference numeral 64 denotes an oil supply pipe line for connecting the discharge side of the oil pump 62 to the port (oil supply port) 2 of the OCV 60 via the oil filter 63. A reference numeral 65 denotes the first pipe line which connects the secondary port 4 of the OCV 60 to the first oil passage 56 of the actuator 32 to communicate the secondary port 4 with the lag hydraulic chamber 51. A reference numeral 66 denotes the second pipe line which connects the secondary port 3 of the OCV 60 to the second oil passage 57 of the actuator 32 to communicate the secondary port 3 with the advance hydraulic chamber 52. A reference numeral 67 denotes a drain pipe line coupled to the ports (drain ports) 5a, 5b of the OCV 60.

A reference numeral 70 denotes an electronic control unit (hereinafter referred to as an ECU) which drives an injector, an igniter and the OCV 60 on the basis of signals supplied mainly from an intake air volume sensor, a throttle sensor, a water temperature sensor, a crank angle sensor and a cam angle sensor (any one not shown) to control a fuel injection quantity, an ignition timing, and a valve opening and closing timing, respectively, and a timing of opening the OCV 60 after the ignition switch is turned off.

Next, the operation of the conventional electromagnetic valve will be described.

First, in the OCV 60, when the linear coil 10 is not conducted, a magnetic attractive force does not generate in the plunger 15 and the spool 6 is moved by the urging force of the spring 16 to hold the plunger 15 at a position separate from the boss 8. Next, when the linear coil 10 is conducted, the plunger 15 and the spool 6 are moved against the urging force of the spring 16 by the magnetic attractive force generated between the boss 8 and the plunger 15 by a magnetic field generated by the linear coil 10.

On the other hand, when the internal combustion engine is stopped, the rotor 36 is at the maximum lagging position where the rotor 36 is relatively rotated in the maximum lagging direction with respect to the housing 33. At this time, the oil pump 62 is also stopped and does not supply the hydraulic oil to the first oil passage 56, to the second oil passage 57 and to the lock-releasing oil passage 42, so that the hydraulic pressure in the actuator 32 is lowered. For this reason, the lock pin 40 is fitted to and engaged with the holder 39 by the urging force of the spring 41 to put the housing 33 and the rotor 36 in the locked state.

When the internal combustion engine is started from this locked state, the oil pump 62 is operated to increase the pressure of the hydraulic oil supplied to the OCV 60. Therefore, the hydraulic oil is supplied from the OCV 60 to the lag hydraulic chamber 51 in the actuator 32 via the first oil pipe line 65 and the first oil passage 56. At that time, the slide plate 55 is moved to the advance hydraulic chamber 52 side by the hydraulic pressure in the lag hydraulic chamber 51 to make the lag hydraulic chamber 51 communicate with the lock-releasing oil passage 42, which supplies the hydraulic oil from the lock-releasing oil passage 42. The lock pin 40 is pressed against the urging force of the spring 41 by the hydraulic oil supplied from the lock-releasing oil passage 42 to the holder 39 and is comed off from the inside of the holder 39 to release the locking of the rotor 36 and the housing 33.

However, since the hydraulic oil is supplied to the lag hydraulic chamber 51, the respective vanes of the rotor 36 are in the state where they are pressed and abutted against the shoes 47 provided in the lagging direction. For this reason, even if the locking of the housing 33 and the rotor 36 is released, the rotor 36 and the housing 33 are pressed each other by the hydraulic pressure of the lag hydraulic chamber 51, which alleviates and eliminates vibrations and impacts.

Next, in order to advance the rotor 36, the hydraulic oil is supplied from the second pipe line 66 via the second oil passage to the advance hydraulic chamber 52 by the OCV 60 and the hydraulic pressure is transmitted from the advance hydraulic chamber 52 to the communication oil passage 53 to push and move the slide plate 55 to lag hydraulic chamber 51 side. The movement of the slide plate 55 communicates the lock-releasing oil passage 42 with the advance hydraulic chamber 52 side of the communication oil passage 53 to transmit the hydraulic pressure from the advance hydraulic chamber 52 to the lock-releasing oil passage 42, and the hydraulic pressure causes the lock pin 40 to be moved to the housing 33 side against the urging force of the spring 41 to disengage the lock pin 40 from the holder 39.

In this disengaged state, by opening or closing the OCV 60 to control the supply quantity of oil, the quantity of the oil in the lag hydraulic chamber 51 and the advance hydraulic chamber 52 are controlled to rotate the rotor 36 in the lagging or advancing direction with respect to the housing 33. For example, when the rotor 36 is advanced to the maximum, the rotor 36 is rotated, with the respective vanes 46 abutted against the shoes 47 on the lag hydraulic chamber 51 side. Further, when the hydraulic pressure of the lag hydraulic chamber 51 is larger than that of the advance hydraulic chamber 52, the rotor 36 is rotated in the lagging direction with respect to the housing 33.

FIG. 14A is an operating state when the control current value supplied from the ECU 70 is 0.1A.

In FIG. 14A the spool 6 is urged to the left end of the valve housing 1 by the spring 16 to make the connection port 2 of the oil supply pipe line 64 communicate with the connection port 4 of the first pipe line 65, and do the connection port 3 of the second pipe line 66 with the drain port Sa. In this state, the hydraulic oil is supplied to the lag hydraulic chamber 51, whereas the hydraulic oil is discharged from the advance hydraulic chamber 52, so that the rotor 36 is rotated counterclockwise with respect to the housing 33 in FIG. 14A to delay the phase of the cam 30 with respect to the timing pulley or the timing sprocket 34 so as to take a lag control.

FIG. 14B is an operating state when the control current value supplied from the ECU 70 is 0.5 A.

In FIG. 14B the magnetic attractive force generated by the magnetic field of the linear coil 10 is balanced with the force of the spring 16. Thus, the spool 6 is kept at a neutral position and a hydraulic pressure supply-discharge system is stopped its operation. This maintains the phase between the cam shaft 30 and the timing pulley or the timing sprocket 34 as it is.

FIG. 14C is an operating state when the control current value supplied from the ECU 70 is 1.0 A.

In FIG. 14C the spool 6 is driven to the right side by the magnetic attractive force generated by the linear coil 10 to supply the hydraulic oil to the advance hydraulic chamber 52 and discharge the hydraulic oil from the lag hydraulic chamber 51, that is, so as to take a lag control.

Such a conventional electromagnetic valve thus constituted as above necessitates, as the support means for the plunger 15, a plunger rod 14 passing through the plunger 15 and fixed to the axial center thereof and two bearings 12, 13 for supporting both end sides of the plunger rod 14 with the boss 8 and the core 11. As a result, the increased number of parts results in the complicated structure and a high-cost. Further, high assembling accuracy lowers the assembly work efficiency. In particular, the electromagnetic valve of this plunger type requires a high centering accuracy in order to coaxially arrange the spool 6 and the plunger 15. However, this arrangement, in which the bearings 12, 13 are fitted to the boss 8 and the core 11, respectively, and the two bearings 12, 13 supporting both end sides of the plunger rod 14 is apt to lower the centering accuracy. Thus, there is a possibility that it would be hard to secure a smooth movement of the plunger 15 because of the contact of the sliding plunger 15 with the boss 8 or the core

SUMMARY OF THE INVENTION

The present invention has been made to solve the above problems. An object of the present invention is to provide an electromagnetic valve which further improves the assembly work, as well as eliminates the need for a plunger rod and bearings, reduces the number of parts and lowers a cost.

Another object of the present invention is to provide a highly reliable electromagnetic valve which secures the smooth movement of a plunger.

Still another object of the present invention is to provide a highly reliable electromagnetic valve which easily secures the centering accuracy of a plunger with respect to a spool and improves an electromagnetic path efficiency.

Still another object of the present invention is to provide an electromagnetic valve which does not impair the smooth movement of the plunger due to air and oil standing between axially provided ends of a pair of fixed iron cores and a plunger coaxially opposed to each other.

Yet another object of the present invention is to provide an electromagnetic valve which achieves a lightweight fixed iron core and a plunger, and overall downsizing.

An electromagnetic valve according to the present invention includes a sleeve bearing coaxially provided with and between the pair of fixed iron cores, and the plunger slidably contacted with the inside of the sleeve bearing.

According to the present invention, since the sleeve bearing is provided between the pair of fixed iron cores, which are arranged on axially provided one end side of the spool sliding in the valve housing and coaxially opposed to each other, and since the plunger is slidably contacted with the inside of the sleeve bearing, the conventional plunger rod and the bearings supporting the both ends thereof are eliminated. This secures the centering accuracy of the plunger with respect to the spool by the pair of fixed iron cores and the sleeve bearing coaxially arranged with the fixed iron cores, as well as reduces the number of parts, simplifies the structure and lowers a cost.

In the sleeve bearing of an electromagnetic valve according to the present invention, the sleeve bearing is made of a non-magnetic material.

According to the present invention, since the sleeve bearing is made of the non-magnetic material, it is free from magnetization. This prevents the fixation of the plunger to the sleeve bearing by the magnetic force and secures the smooth movement of the plunger.

In the electromagnetic valve according to the present invention, a centering portion for coaxially adjoining the fixed iron cores to the sleeve bearing is provided on at least axially provided one end of the sleeve bearing.

According to the present invention, the pairs of fixed iron cores are provided on at least axially provided one end of the sleeve bearing and the centering portion for coaxially adjoining the sleeve bearing. This secures the coaxial arrangement of the pair of fixed iron cores and the sleeve bearing.

In the centering portion of an electromagnetic valve according to the present invention, the centering portion is a fitting portion, formed on at least axially provided one end of the sleeve bearing and fitted to and engaged with the axially provided end of the fixed iron cores.

According to the present invention, the fitting portion is provided, which is formed on at least axially provided one end of the sleeve bearing, and is fitted to and engaged with axially provided one end of the fixed iron cores. Only by fitting and engaging the fitting portion of the sleeve bearing to and with the fixed iron cores, the sleeve bearing can easily be mounted coaxially with the fixed iron cores, thereby improving the assembly work thereof, and by slidably contacting the plunger with the inside of the sleeve bearing, the centering accuracy of the plunger with respect to the spool can easily be secured.

In the sleeve bearing of an electromagnetic valve according to the present invention, a communication groove for making the front side of the sleeve bearing communicate with the rear side thereof is formed on the surface slidably contacted with the plunger.

According to the present invention, since the communication grooves for making the front side of the sleeve bearing communicate with the rear side thereof are formed on the surface of the sleeve bearing where the sleeve bearing is slidably contacted with the plunger, the air or oil standing between the plunger and the fixed iron cores is discharged.

In the sleeve bearing of an electromagnetic valve according to the present invention, the cross section of the inside of the sleeve bearing is formed in polygonal shape, and the plunger of circular cross section is slidably contacted with the inside in polygonal shape.

According to the present invention, since the cross section of the inside of the sleeve bearing is formed in polygonal shape and the plunger of circular cross section is slidably contacted with the cross section of the inside surface in polygonal shape, the communication grooves for making the front side of the sleeve bearing communicate with the rear side thereof can be formed between the inside surface of the sleeve bearing and the outer peripheral surface of the plunger. This discharges the air or oil standing between the plunger and the fixed iron cores.

In the electromagnetic valve according to the present invention, the spool is coaxially abutted against but not coupled to the plunger.

According to the present invention, since the spool is coaxially contacted with but is not combined with the plunger, the occurrence of a pry as in the case with where the spool is mechanically fixed to the plunger is prevented.

In the electromagnetic valve according to the present invention, the spool is made of a non-magnetic material.

According to the present invention, since the spool is made of the non-magnetic material, the spool is free from magnetization. This secures the smooth movement of the plunger because the spool is not fixed to the plunger by the magnetic force.

In an electromagnetic valve according to the present invention, a communication groove for making the front side of the plunger communicate with the rear side thereof is formed on the outer peripheral surface of the plunger.

According to the present invention, communication grooves for communicating the front side of the sleeve bearing with the rear side thereof are formed on the outer peripheral surface of the plunger. This discharges the air or oil standing between the plunger and the fixed iron cores.

In an electromagnetic valve according to the present invention, an internal hollow is formed in the plunger along the axial center.

According to the present invention, since the inside hollow extending along the axial center is formed in the plunger, the plunger becomes lighter, thereby further improving the response performance of the plunger.

In the electromagnetic valve according to the present invention, the internal hollow is a non-through hole opened to the end which is axially opposite to the spool of the plunger.

According to the present invention, the non-through hole opened to the end which is axially opposite to the spool side of the plunger is formed as the inside hollow of the plunger. This becomes lighter the plunger and further improves the response performance of the plunger, as well as discharges the air or oil standing between the plunger and the fixed iron cores.

In the electromagnetic valve according to the present invention, the internal hollow is a thorough hole passing thorough the axial center of the plunger.

According to the present invention, the through hole passing through an axial center of the plunger is formed as the inside hollow of the plunger. This becomes lighter the plunger and further improves the response performance of the plunger, as well as discharges the air or oil standing between the plunger and the fixed iron cores.

In the electromagnetic valve according to the present invention, the diameter of the through hole at a spool side is small.

According to the present invention, since the diameter of the through hole of the plunger at the spool side is small, the spool and the plunger are kept in contact with each other.

In the electromagnetic valve according to the present invention, a groove for opening the through hole of the plunger is radially formed on either of end surfaces axially provided at the contacted surface of the spool and the plunger.

According to the present invention, at the surface where the spool is contacted with the plunger, the grooves for opening the through hole of the plunger are radially formed on either of the axially provided end surfaces of the spool and the plunger. This prevents the through hole from being closed by the contact of the spool and the plunger, and discharges the air or oil standing between the plunger and the fixed iron cores.

The above and other objects and the attendant advantages of the invention will become readily apparent by referring to the following detailed description of the preferred embodiments when considered in conjunction with the accompanying drawings.

BRIEF DESCRIPTION OF THE DRAWINGS

FIGS. 7A, 7B and 7C are a cross sectional views showing various modifications of the sleeve bearing of an electromagnetic valve according to a fifth embodiment.

Throughout the figures, the same reference numerals, and characters, unless otherwise noted, are used to denote like features, elements, components, or portions of the illustrated embodiments.

DESCRIPTION OF THE PREFERRED EMBODIMENTS

The preferred embodiments of the present invention will be described in detail with reference to accompanying drawings.

First Embodiment

Figure 1:
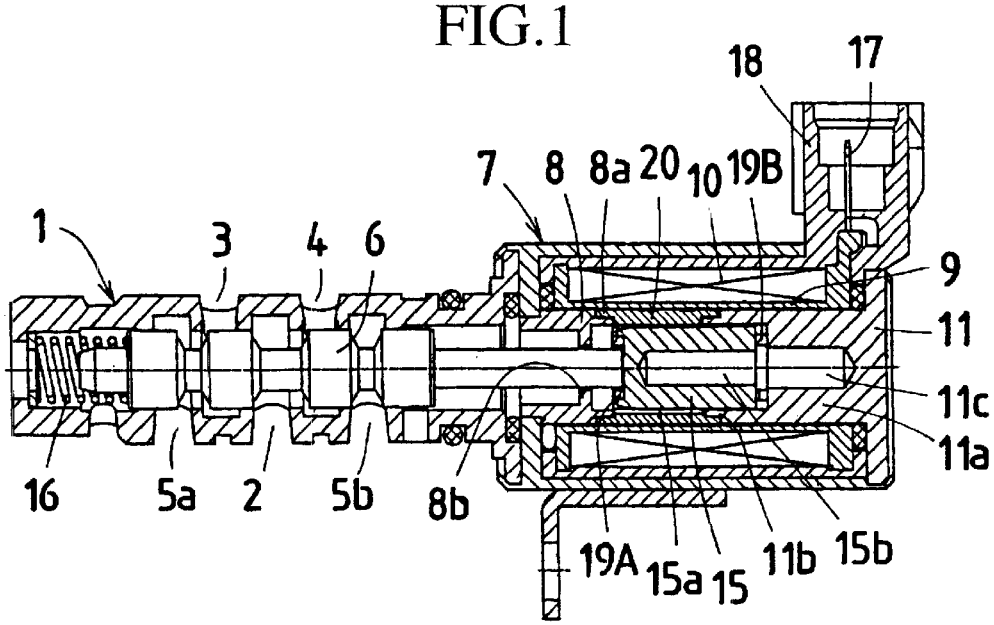
FIG. 1 is a cross sectional view showing an electromagnetic valve according to a first embodiment.
Figure 2:
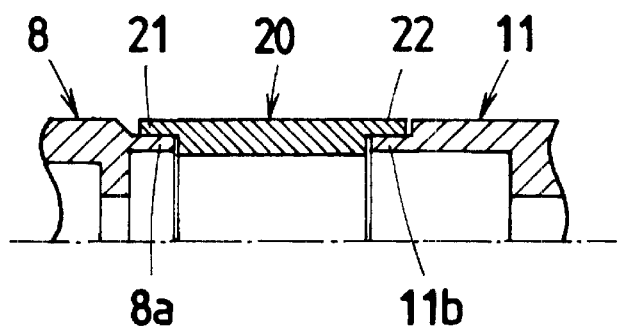
FIG. 2 is an enlarged cross sectional view of the purview in FIG. 1.

FIG. 1 is a cross sectional view showing an electromagnetic valve according to a first embodiment. FIG. 2 is an enlarged cross sectional view of the purview in FIG. 1. In FIG. 2 the same reference numerals as those in FIG. 1 are used and description thereof will be omitted for brevity sake.

Referring to FIGS. 1, 2, a reference numeral 20 denotes a sleeve bearing for sliding a plunger 15, and the sleeve bearing 20 is made of a non-magnetic material which has a cross section in a round shape and an outside diameter nearly equal to the inside diameter of a coil bobbin 9.

Such a sleeve bearing 20 is straddled over ends axially opposed to each other of a pair of boss (fixed iron core) 8 and core (fixed iron core) 11 coaxially opposed to each other at the axially provided one end side of the spool 6 and is coaxially arranged with the boss 8 and the core 11.

Reference numerals 21, 22 are annular stepped fitting portions formed on the inner peripheral surface of axially provided both ends of the sleeve bearing 20. These fitting portions 22, 23 which are formed in concentric annular shape and has the same inside diameters as the outside diameters of the axially opposed ends 8a, 11b of the boss 8 and the core 11. One fitting portion (left side in FIG. 2) 21 of them is fitted to and engaged with the end 8a of the boss 8 axially opposed to the core 11, and the other fitting portion (right side in FIG. 2) 22 which is fitted to and engaged with the end 11b axially opposed to the boss 8 of the core 11.

In this manner, the fitting portions 21, 22 of axially provided both ends of the sleeve bearing 20 are fitted to and engaged with the ends 8a, 11b which are axially opposed to the boss 8 and the core 11. The sleeve bearing 20 is coaxially adjoined to and held by the boss 8 and the core 11. A plunger 15 is slidably contacted with the inner peripheral surface of the sleeve bearing 20. Thus, the fitting portions 21, 22 serve as centering portions for coaxially adjoining the sleeve bearing 20 to the boss 8 and the core 11 as the fixed iron cores.

Figure 3A:
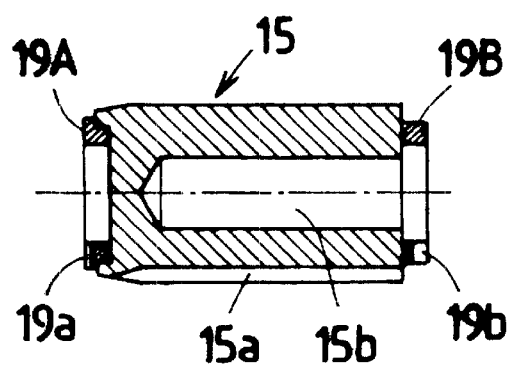
FIG. 3A is an enlarged cross sectional view of the plunger in FIG. 1.
Figure 3B:
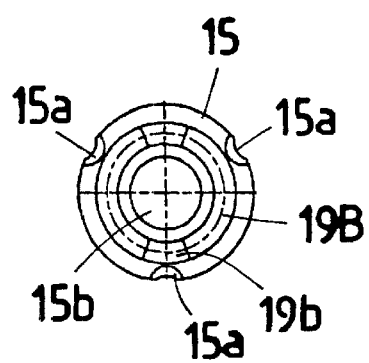
FIG. 3B is the right end face view in FIG. 3A.

FIG. 3A is an enlarged cross sectional view of the plunger 15 in FIG. 1. FIG. 3B is the right end face view in FIG. 3A.

Referring to FIGS. 3A, 3B, a reference numeral 15a denotes communication grooves which are formed on the outer peripheral surface of the plunger 15 and communicate the front of the plunger 15 with the rear thereof. The communication grooves 15a, as shown in FIG. 3B, are grooves circumferentially formed on the outer peripheral surface of the plunger 15 in parallel at a plurality of positions at arbitrary intervals. A reference numeral 15b denotes an inside hollow formed along the axial center of the plunger 15. The inner hollow 15b is a non-through hole opened to the axially provided other end surface of the core 11 of the plunger 15 (see FIG. 1). Similarly, also in the core 11, as shown in FIG. 1, an inner hollow 11c of a non-through hole is formed, which is opened to the surface opposed to the plunger 15.

Reference numerals 19A, 19B denote ring members integrally provided with both ends of the plunger 15 and is made of an elastic member such as rubber or the like. Reference numerals 19a, 19b denote cutout grooves radially formed on the tip ends of the ring members 19A, 19B, respectively. Out of these cutout grooves 19a, 19b, the cutout groove 19a of the ring member 19A opposed to a radially provided partition wall 8b formed integrally with the boss 8 in FIG. 1 makes the inside of the ring 19A communicate with the communication groove 15a, and the cutout groove 19b of the ring member 19B on the opposite side makes the communication groove 15a communicate with the inner hollow 15b.

Next, the operation of the first embodiment will be described.

When the linear coil 10 is not conducted, as shown in FIG. 1, the plunger 15 is held in contact with the core 11 via the ring member 19B by the urging force of the spring 16. In this state, when the linear coil 10 is conducted, the plunger 15 is moved toward the boss 8 against the urging force of the spring 16, while sliding in the sleeve bearing 20 coaxially provided with the boss 8 and the core 11, by the magnetic attractive force generated on the boss 8 side.

At this time, air or oil standing between the partition wall 8b in the boss 8 and the plunger 15 is compressed, but the air escapes from the cutout groove 19a of the ring member 19A opposed to the partition wall 8b through the communication groove 15a to the gap between the plunger 15 and the core 11. For this reason, the plunger 15 smoothly slides in the sleeve bearing 20. Then, when the ring 19A contacts to the partition wall 8b, the spool 6 is switched to the predetermined opening and closing positions.

When the linear coil 10 is not conducted in this state, the plunger 15 is moved to the core 11 side via the spool 6 by the urging force of the spring 16. Here, since the spool 6 and the sleeve bearing 20 are made of a non-magnetic material, they are free from magnetization when the linear coil 10 is conducted.

Further, when the plunger 15 is moved to the core 11 side, the air or oil standing between the plunger 15 and the core 11 is compressed, but the air flows from the cutout groove 19b on the ring 19B radially formed on the core 11 side of the plunger 15 through the radially formed communication groove 15a of the plunger 15 to the boss 8 side.

Therefore, when the linear coil 10 is not conducted, the plunger 15 can be quickly moved to the core 11 side.

According to the first embodiment described above, between the boss 8 and the core 11, which are coaxially opposed to each other at axially provided one end side of the spool 6 and form the pair of fixed iron cores, the sleeve bearing 20 coaxially straddling over the boss 8 and the core 11 is provided, and the plunger 15 is held in contact with the inner peripheral surface of the sleeve bearing 20. This eliminates the need for the conventional plunger rod and the bearings supporting both ends of the plunger rod. Moreover, this secures the centering accuracy of the plunger 15 with respect to the spool 6 by the sleeve bearing 20 coaxially provided with the boss 8 and the core 11, as well as reduces the number of parts, simplifies the structure and lowers a cost.

Further, since both ends of the sleeve bearing 20 are provided with concentric annular fitting portions 21, 22 having the same inside diameters as the outside diameters of the ends 8a, 11b coaxially opposed to each other of the boss 8 and the core 11, the sleeve bearing 20 can easily be mounted coaxially with the boss 8 and the core 11, only by fitting and engaging the fitting portions 21, 22 of both ends of the sleeve bearing 20 to and with the ends 8a, 11b axially opposed to each other of the boss 8 and the core 11. This easily secures the centering accuracy of the plunger 15 with respect to the spool 6, only by holding the plunger 15 in slidably contact with the inner peripheral surface of the sleeve bearing 20, as well as improves the assembly work.

Still further, as described above, since the plunger 15 is slidably contacted with the inner peripheral surface of the sleeve bearing 20 coaxially adjoined to the boss and the core 11, the gap between the plunger 15 and the boss 8, and core 11 can be narrowed. This improves an electromagnetic path efficiency.

Still further, since the spool 6 and the sleeve bearing 20 are made of the non-magnetic material, they are free from magnetization. This prevents the spool 6 from being subjected to the magnetic path and the fixation of the plunger 15 to the sleeve bearing 20 by the magnetic force, thereby securing the smooth movement of the spool 6 and the plunger 15.

Yet further, since the communication grooves 15a are axially formed on the outer peripheral surface of the plunger 15, the cutout grooves 19a, 19b communicating with the communication grooves 15a are radially formed on the ring 19A, 19B at the both ends of the plunger 15, and the front side and rear side of the plunger 15 communicate with each other by these cutout grooves 19a, 19b and the communication grooves 15a, the air pressure compressed by the plunger 15 is free to escape. This prevents the smooth movement of the plunger 15 from being impaired by the air standing between the boss 8 and the plunger 15, and between the core 11 and the plunger 15.

Second Embodiment

Figure 4:
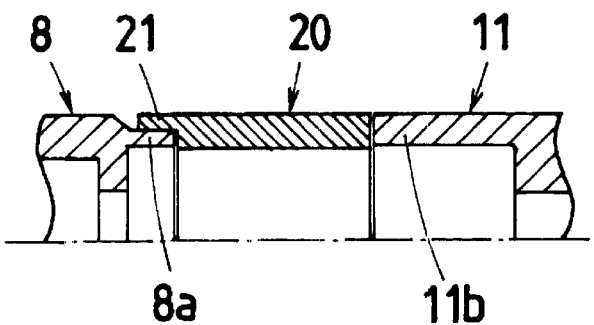
FIG. 4 is a cross sectional view showing the purview of an electromagnetic valve according to a second embodiment.

FIG. 4 is a cross sectional view showing the purview of an electromagnetic valve according to a second embodiment.

Whereas, in the above first embodiment, the fitting portions 21, 22 for centering are formed on axially provided both ends of the sleeve bearing 20, in this second embodiment, an annular stepped fitting portion 21 is formed only on the end axially provided on the boss 8 side of the sleeve bearing 20, as with the first embodiment. The end surface axially provided on the core 11 side of the sleeve bearing 20 is coaxially adjoined to the axially provided end surface of the core 11.

Such a configuration coaxially adjoins the opposite end of the sleeve bearing 20 to the axially provided end surface of the core 11 by fitting the fitting portion 21 of the sleeve bearing 20 to the axially opposed end 8a of the boss 8. As with the above first embodiment, this narrows the gap between the plunger 15 and the boss 8, thereby improving the electromagnetic path efficiency, as well as securing the centering accuracy of the plunger 15 with respect to the spool 16.

Third Embodiment

Figure 5:
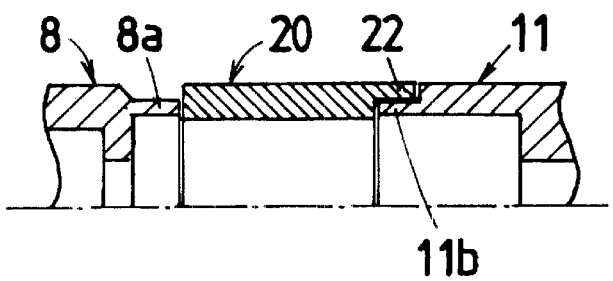
FIG. 5 is a cross sectional view showing the purview of an electromagnetic valve according to a third embodiment.

FIG. 5 is a cross sectional view showing the purview of an electromagnetic valve according to a third embodiment.

In this third embodiment, in contrast to the above second embodiment, the fitting portion 22 for centering is provided only on the end axially provided on the core 11 side of the sleeve bearing 20 and the end surface axially provided on the boss 8 side of the sleeve bearing 20 is coaxially adjoined to the axially provided end surface of the boss 8.

Accordingly, as with the above second embodiment, this third embodiment narrows the gap between the plunger 15 and the boss 8, thereby improving the electromagnetic path efficiency, as well as the centering accuracy of the plunger 15 with respect to the spool 16.

Fourth Embodiment

Figure 6:
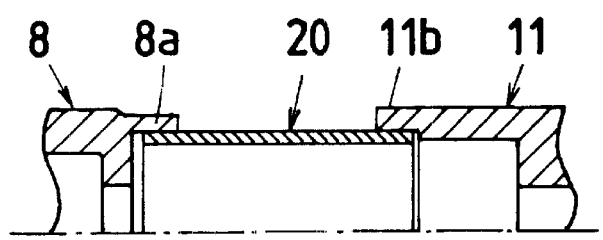
FIG. 6 is a cross sectional view showing the purview of an electromagnetic valve according to a fourth embodiment.

FIG. 6 is a cross sectional view showing the purview of an electromagnetic valve according to a fourth embodiment.

In this fourth embodiment, a straight pipe which has the same diameter along its entire length and is made of a non-magnetic material is used as a sleeve bearing 20, and both ends of which are fitted to and engaged with the inside surface of the axially opposed ends of the boss 8 and the core 11.

Such a configuration takes the same effects as the first embodiment. Further, the sliding contact area of the plunger 15 becomes larger, thereby further smoothly moving the plunger 15.

Fifth Embodiment

Figure 7A:
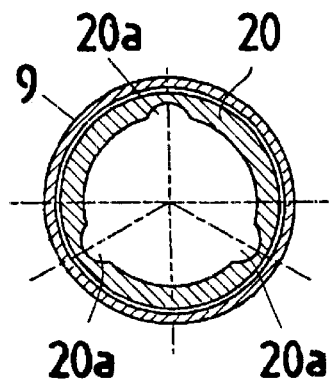
Figure 7A:
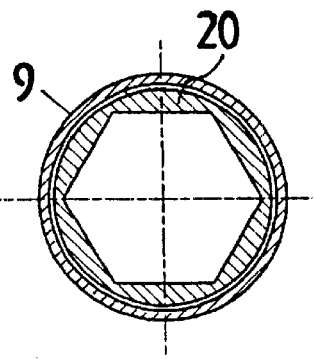
Figure 7C:
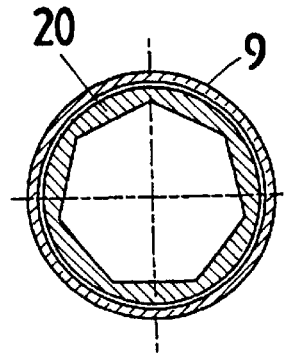

FIGS. 7A, 7B and 7C are cross sectional views showing various modifications of the sleeve bearing of the electromagnetic valve according to a fifth embodiment.

Referring to FIG. 7A, a reference numeral 20a denotes a communication groove which is axially formed on the inner peripheral surface of a sleeve 20 and makes the front side of the sleeve bearing 20 communicate with the rear side thereof. That is, while, in the above first embodiment, the communication grooves 15a are formed on the outer peripheral surface of the plunger 15, in this fifth embodiment, communication grooves 20a are formed on the inner peripheral surface of the sleeve bearing 20. Therefore, even as in the case of the sleeve bearing 20 shown in FIG. 7A this fifth embodiment takes the same effects as with the plunger 15 in FIG. 3.

In the sleeve bearing 20 shown in FIG. 7B, the cross section of the inner peripheral surface is formed in hexagon shape, and in the sleeve bearing 20 shown in FIG. 7B, the cross section of the inner peripheral surface is formed in octagonal shape. In short, as shown in FIGS. 7B, 7C, the inner peripheral surface of the sleeve bearing 20 may be formed in polygonal shape. In this case, a plunger 15 of a circular cross section is slidably contacted with the inner peripheral surface of the sleeve bearing 20 in polygonal shape.

Such a configuration provides communication grooves for making the front side of the sleeve bearing 20 communicate with the rear side thereof between the outer peripheral surface of the plunger 15 and the inner peripheral surface of the sleeve bearing 20. Therefore, this fifth embodiment takes the same effects as with the plunger 15 shown in FIG. 3.

Sixth Embodiment

Figure 8:
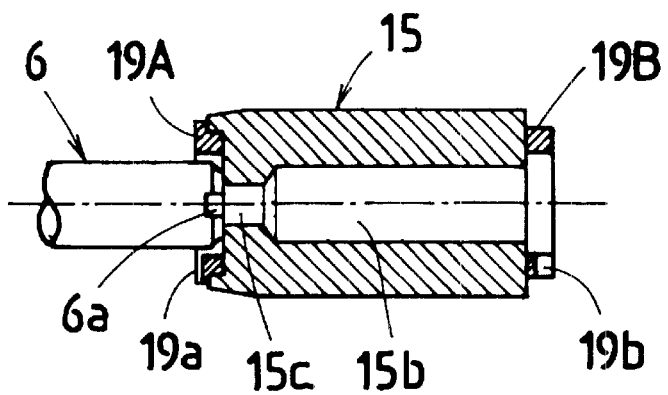
FIG. 8 is a cross sectional view showing the purview of an electromagnetic valve according to a sixth embodiment.

FIG. 8 is a cross sectional view showing the purview of an electromagnetic valve according to a sixth embodiment.

Referring to FIG. 8, a reference numeral 15c denotes a small hole (communication hole) which is formed in the end wall on the spool 6 side of the plunger 15 and opens the inside hollow 15b in the plunger 15 to the boss 8 side. A reference numeral 6a denotes a groove which is radially formed on the end surface of the plunger 15 side of the spool 6 and prevents the inside hollow 15b from being closed by the contact of the end surface axially provided on the spool 6 of the plunger 15. Therefore, this sixth embodiment takes the same effects as with the communication groove 15a of the plunger 15 shown in FIG. 3.

Seventh Embodiment

Figure 9:
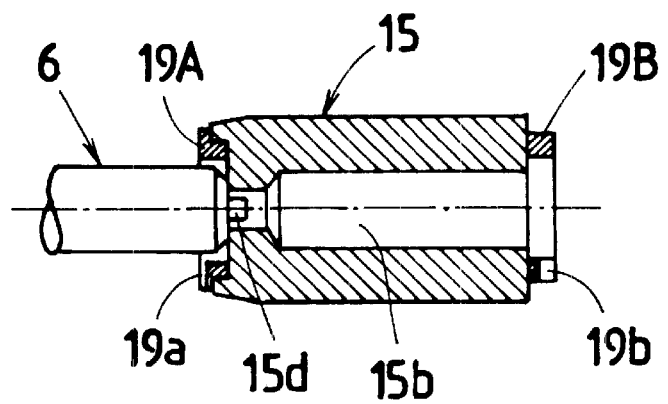
FIG. 9 is a cross sectional view showing the purview of an electromagnetic valve according to a seventh embodiment.

FIG. 9 is a cross sectional view showing the purview of an electromagnetic valve according to a seventh embodiment.

In this seventh embodiment, a radially extending groove 15d is formed on the end surface of the spool 6 side of the plunger 15 of the sixth embodiment and the end surface axially provided on the plunger 15 side of the spool 6 is made flat as usual. The radially formed groove 15d prevents the small hole 15c from being closed by the end surface of the spool 6. Therefore, this seventh embodiment takes the same effects as with the communication groove 15a of the plunger 15 shown in FIG. 3.

Eighth Embodiment

Figure 10:
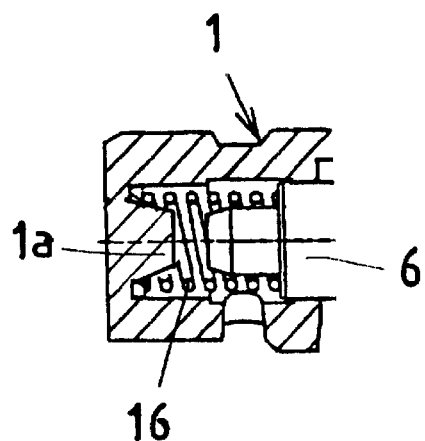
FIG. 10 is a cross sectional view showing the purview of an electromagnetic valve according to an eighth embodiment.
Figure 11:
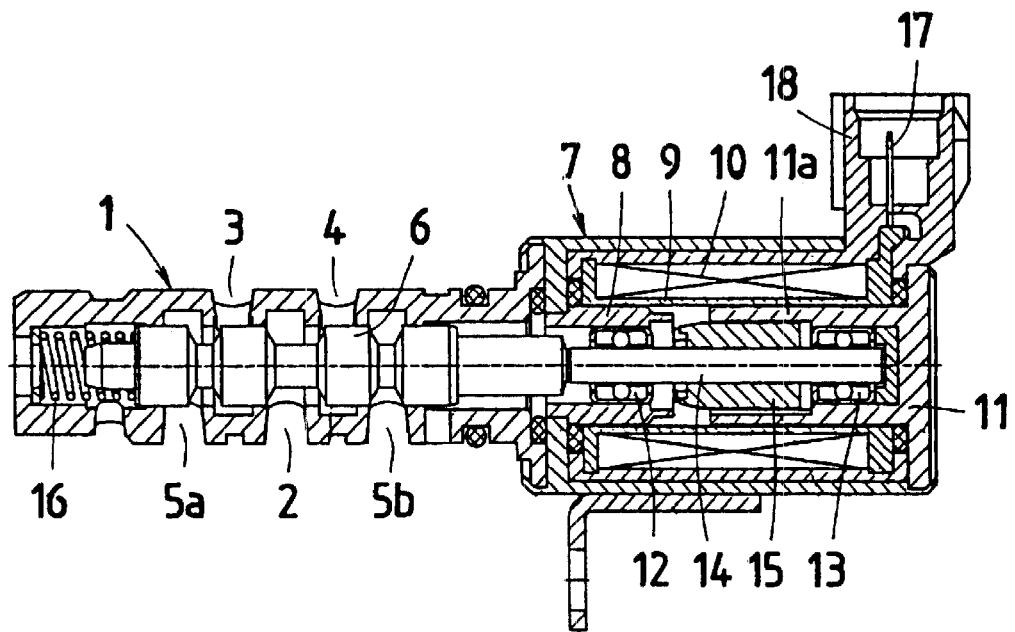
FIG. 11 is a cross sectional view showing a conventional electromagnetic valve.
Figure 13:
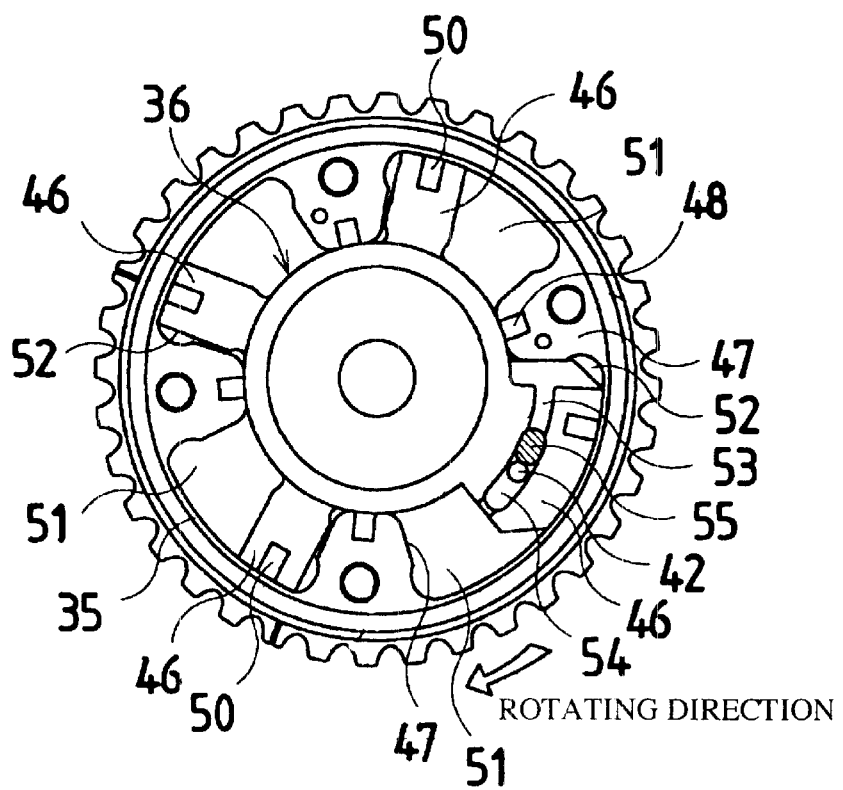
FIG. 13 is a cross sectional view taken along a line A A in FIG. 12.
Figure 12:
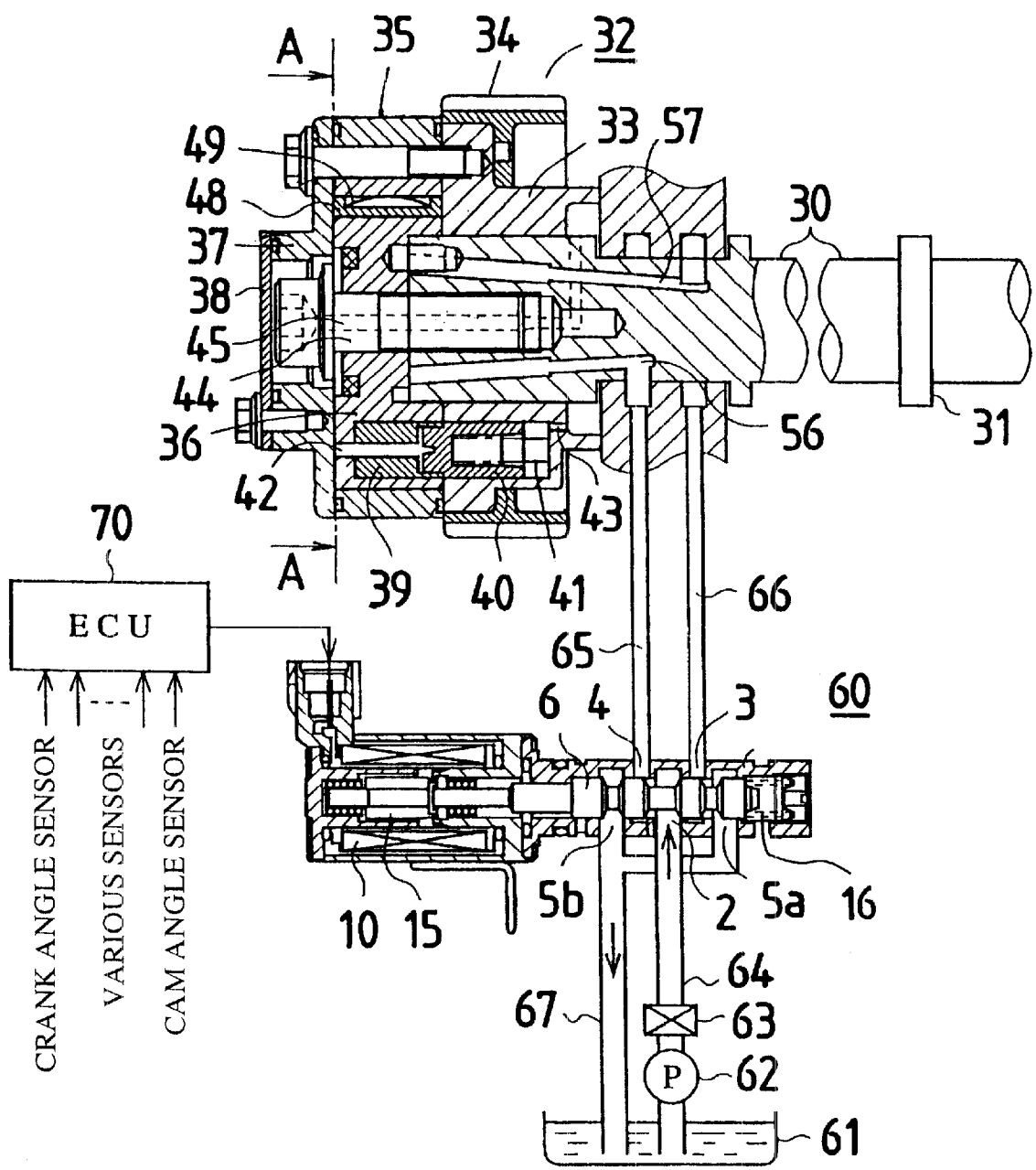
FIG. 12 is a cross sectional view showing an example of a valve timing adjusting device with the electromagnetic valve in FIG. 11.
Figure 14A:
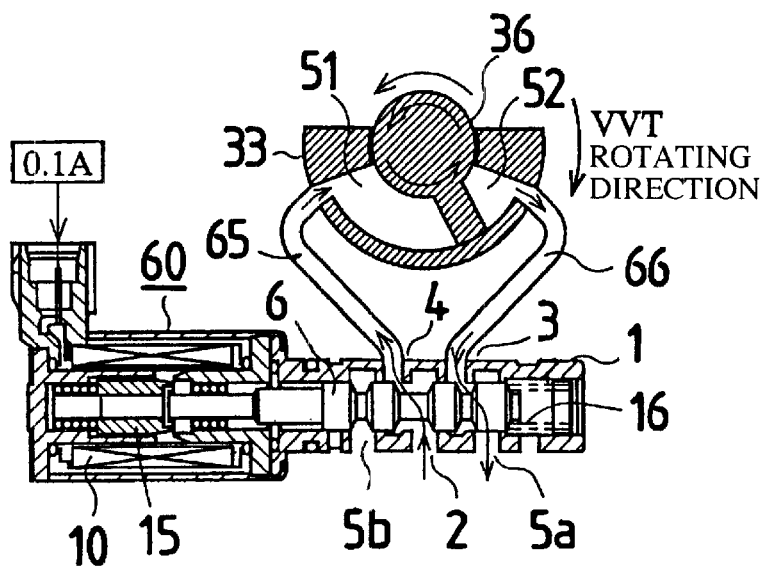
FIG. 14A is an operating state when the control current value supplied from the ECU 70 is 0.1A.
Figure 14B:
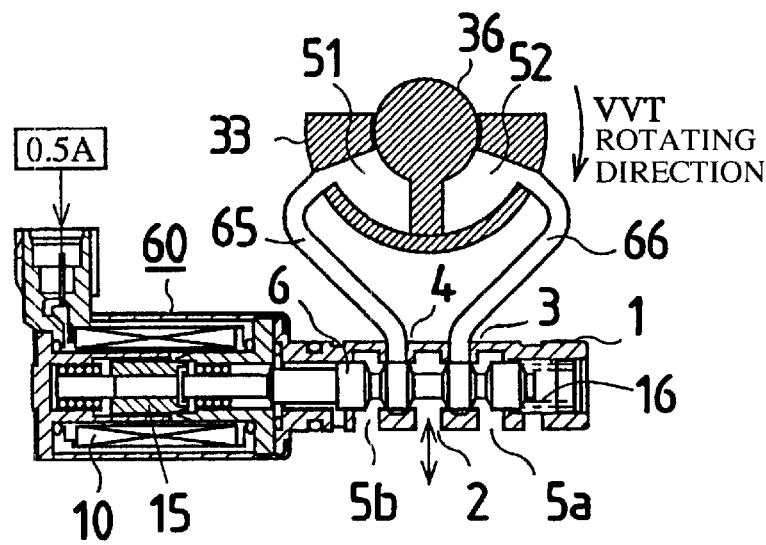
FIG. 14B is an operating state when the control current value supplied from the ECU 70 is 0.5 A.
Figure 14C:
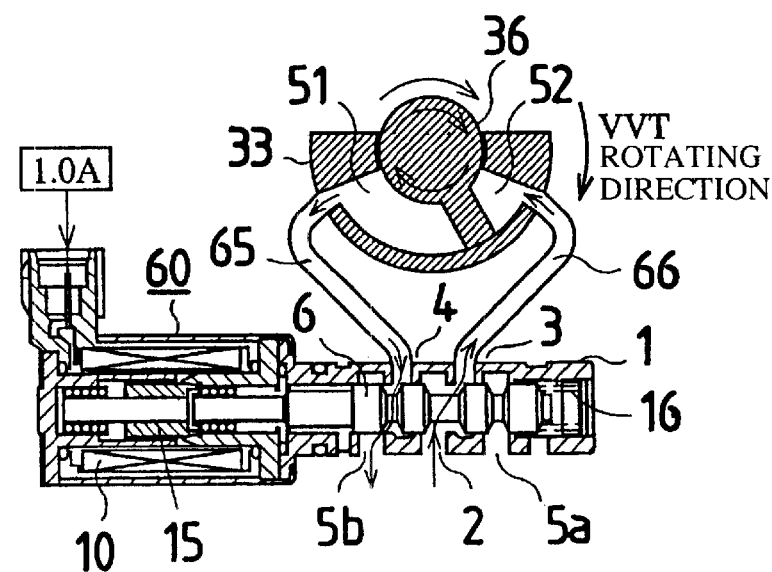
FIG. 14C is an operating state when the control current value supplied from the ECU 70 is 1.0 A.

FIG. 10 is a cross sectional view showing the purview of an electromagnetic valve according to an eighth embodiment.

Referring to FIG. 10, a reference numeral 1a denotes a stopper which is provided on the inside end surface on the receiving side of the spring 16 in the valve housing 1 and sets the limit position of movement of the spool 6 by the magnetic force. This arrangement prevents the excessive compression of the spring 16.

While, in the above preferred embodiments of the invention, an electromagnetic valve is given as an example, it should be understood by those skilled in the art that various modifications and changes may be made without departing from the sprit and scope of the invention.

Also, it should be noted that the invention meets all the objects mentioned above and also has the advantages of wide commercial utility, and that the invention has been set forth for purposes of illustration only and not of limitation. That is, the invention is limited only by the following claims which follow. Consequently, reference should be made to the following claims in determining the full scope of the invention.

What is claimed is:

1. An electromagnetic valve comprising:
   a valve housing having a plurality of ports for connecting fluid passages;
   a spool, slidably accommodated in the valve housing, for opening or closing the ports;
   a pair of fixed iron cores arranged on axially provided one end side of the spool and coaxially opposed to each other; and
   a plunger coaxially arranged with the spool between the fixed iron cores and operatively retained by the spool;
   wherein a sleeve bearing is coaxially provided with and between the pair of fixed iron cores, and wherein the plunger is slidably contacted with the inside of the sleeve bearing.

2. The electromagnetic valve according to claim 1, wherein the sleeve bearing is made of a non-magnetic material.

3. The electromagnetic valve according to claim 1, wherein a centering portion for coaxially adjoining the fixed iron cores to the sleeve bearing is provided on at least axially provided one end of the sleeve bearing.

4. The electromagnetic valve according to claim 3, wherein the centering portion is a fitting portion, formed on at least axially provided one end of the sleeve bearing and fitted to and engaged with the axially provided end of the fixed iron cores.

5. The electromagnetic valve according to claim 1, wherein a communication groove for making the front side of the sleeve bearing communicate with the rear side thereof is formed on the surface slidably contacted with the plunger.

6. The electromagnetic valve according to claim 1, wherein the cross section of the inside of the sleeve bearing is formed in polygonal shape, and wherein the plunger of circular cross section is slidably contacted with the inside in polygonal shape.

7. The electromagnetic valve according to claim 1, wherein the spool is coaxially abutted against but not coupled to the plunger.

8. The electromagnetic valve according to claim 1, wherein the spool is made of a non-magnetic material.

9. The electromagnetic valve according to claim 1, wherein a communication groove for making the front side of the plunger communicate with the rear side thereof is formed on the outer peripheral surface of the plunger.

10. The electromagnetic valve according to claim 1, wherein an internal hollow is formed in the plunger along the axial center.

11. The electromagnetic valve according to claim 10, wherein the internal hollow is a non-through hole opened to the end which is axially opposite to the spool of the plunger.

12. The electromagnetic valve according to claim 10, wherein the internal hollow is a through hole passing thorough the axial center of the plunger.

13. The electromagnetic valve according to claim 12, wherein the diameter of the through hole at the spool side is small.

14. The electromagnetic valve according to claim 12, wherein a groove for opening the through hole of the plunger is radially formed on either of end surfaces axially provided at the contacted surface of the spool and the plunger.

* * * * *